United States Patent
Kim et al.

(10) Patent No.: US 11,667,752 B2
(45) Date of Patent: Jun. 6, 2023

(54) COPOLYESTER INCLUDING CYCLIC ALIPHATIC UNIT, METHOD OF PREPARING THE SAME, AND OPTICAL FILM WITH LOW WATER ABSORPTION AND LOW BIREFRINGENCE INCLUDING THE SAME

(71) Applicant: Research & Business Foundation Sungkyunkwan University, Suwon-si (KR)

(72) Inventors: Jinhwan Kim, Seoul (KR); Soo-Jung Kang, Anyang-si (KR); SangWon Park, Seoul (KR); Jae Min Jeong, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 306 days.

(21) Appl. No.: 16/992,319

(22) Filed: Aug. 13, 2020

(65) Prior Publication Data
US 2021/0108031 A1    Apr. 15, 2021

(30) Foreign Application Priority Data
Oct. 11, 2019    (KR) .................. 10-2019-0125770

(51) Int. Cl.
*C08G 63/85*    (2006.01)

(52) U.S. Cl.
CPC .................. *C08G 63/85* (2013.01)

(58) Field of Classification Search
CPC .... C08G 63/85; C08G 63/189; C08G 63/199; C08G 63/672; C08G 63/183; C08G 63/80; C08J 5/18; C08J 2367/02; C08K 3/014; C08K 3/32; C08K 3/005; C08K 3/521
See application file for complete search history.

(56) References Cited

U.S. PATENT DOCUMENTS

| | | | |
|---|---|---|---|
| 6,914,120 B2 * | 7/2005 | Germroth ............ | C08G 63/672 528/307 |
| 2012/0177854 A1 * | 7/2012 | Lee .................... | G06F 8/65 428/35.7 |
| 2012/0196979 A1 * | 8/2012 | Kliesch ............... | H01L 31/049 428/220 |

FOREIGN PATENT DOCUMENTS

| KR | 10-2017-0037588 A | 4/2017 |
| KR | 10-2019-0087397 A | 7/2019 |

OTHER PUBLICATIONS

Korean Office Action dated Oct. 21, 2020 in counterpart Korean Patent Application No. 10-2019-0125770 (5 pages in Korean).

* cited by examiner

*Primary Examiner* — Robert S Jones, Jr.
(74) *Attorney, Agent, or Firm* — NSIP Law

(57) ABSTRACT

The present disclosure relates to a copolyester including a polymer formed by polymerization of monomers represented by the following Structural Formula 1 to Structural Formula 4:

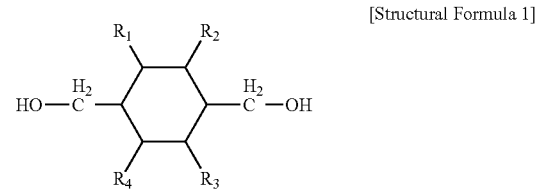

[Structural Formula 1]

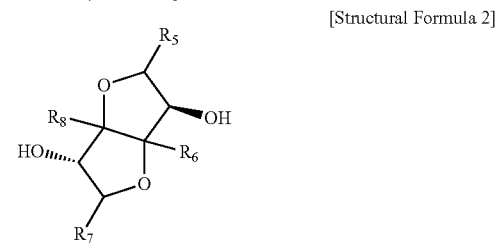

[Structural Formula 2]

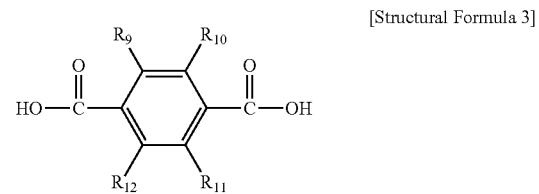

[Structural Formula 3]

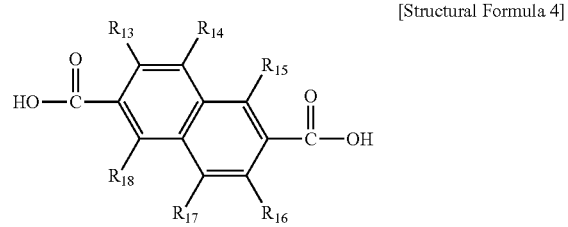

[Structural Formula 4]

(in the above Structural Formula 1 to Structural Formula 4, $R_1$ to $R_{18}$ are identical to or different from each other and are each independently selected from the group consisting of H, substituted or unsubstituted linear or branched $C_1$-$C_{20}$ alkyl and substituted or unsubstituted $C_6$-$C_{20}$ aryl).

11 Claims, 1 Drawing Sheet

[Fig.1]
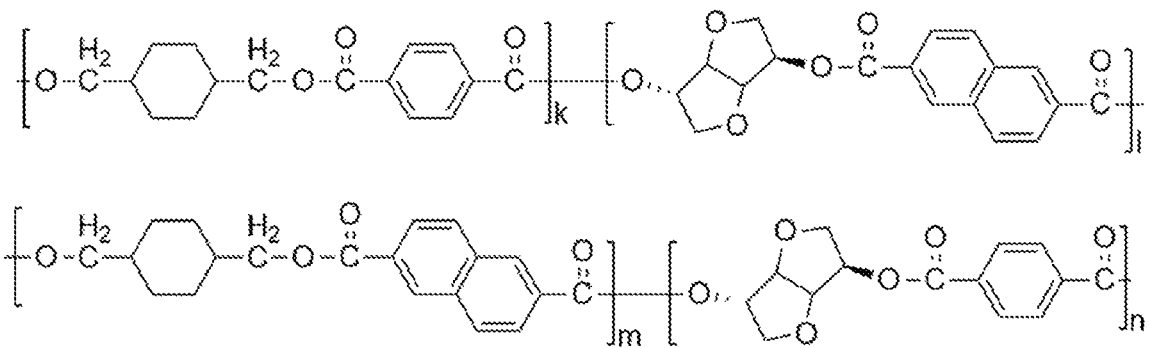
[Fig.2]

COPOLYESTER INCLUDING CYCLIC ALIPHATIC UNIT, METHOD OF PREPARING THE SAME, AND OPTICAL FILM WITH LOW WATER ABSORPTION AND LOW BIREFRINGENCE INCLUDING THE SAME

CROSS-REFERENCE TO RELATED APPLICATION

This application claims the benefit under 35 USC 119(a) of Korean Patent Application No. 10-2019-0125770 filed on Oct. 11, 2019, in the Korean Intellectual Property Office, the entire disclosure of which is incorporated herein by reference for all purposes.

BACKGROUND

1. Field

The present disclosure relates to a copolyester including cyclic aliphatic units, a method of preparing the same, and an optical film with low water absorption and low birefringence including the same.

2. Description of Related Art

A display device, such as LED, LCD, and OLED, includes a polymer substrate and an active layer. A material used for the active layer sensitively reacts to water and oxygen and is decomposed or degenerated. Particularly, studies on an optical film with improved water absorption and water barrier properties that may severely reduce the lifetime of the device are needed.

Examples of conventionally used optical films may include polyethylene terephthalate (PET), polyethylene naphthalate (PEN) and poly(1,4-cyclohexylenedimethylene terephthalate) (PCT). However, PET, PEN or PCT has low thermal resistance or high birefringence and thus is not suitable for display purposes or has high melt polymerization temperature or fast crystallization rate, which has caused difficulty in manufacturing. Also, a film manufactured using PET, PEN or PCT is broken easily and crystallized at high temperature and thus degraded in properties.

Korean Patent Laid-open Publication No. 2019-0087397 relates to a colorless polyamide-imide resin and a film thereof, but is not sufficient to improve the above-described problems.

Accordingly, studies on an optical film capable of improving the problems are needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a copolyester containing a polymer formed by polymerization of monomers represented by the following Structural Formula 1 to Structural Formula 4:

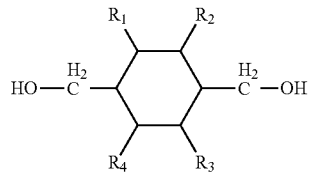

[Structural Formula 1]

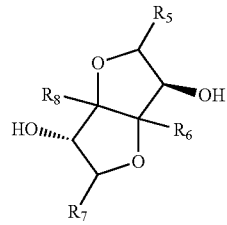

[Structural Formula 2]

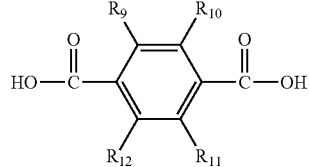

[Structural Formula 3]

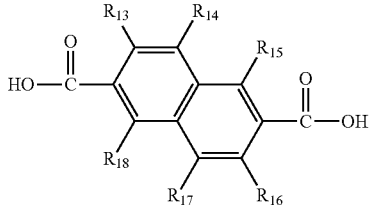

[Structural Formula 4]

(in the above Structural Formula 1 to Structural Formula 4, $R_1$ to $R_{18}$ are identical to or different from each other and are each independently selected from the group consisting of H, substituted or unsubstituted linear or branched $C_1$-$C_{20}$ alkyl and substituted or unsubstituted $C_6$-$C_{20}$ aryl).

The monomer represented by the above Structural Formula 1 or Structural Formula 2 and the monomer represented by the above Structural Formula 3 or Structural Formula 4 may be each independently bonded to form a polymer, but may not be limited thereto.

The copolyester may include a structure represented by the following Structural Formula 5 to Structural Formula 8, but may not be limited thereto:

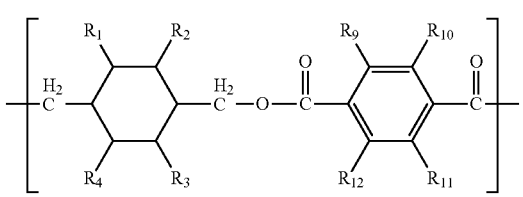

[Structural Formula 5]

[Structural Formula 6]

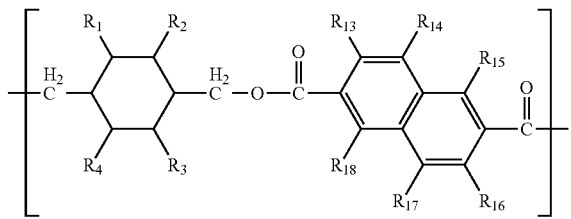

[Structural Formula 7]

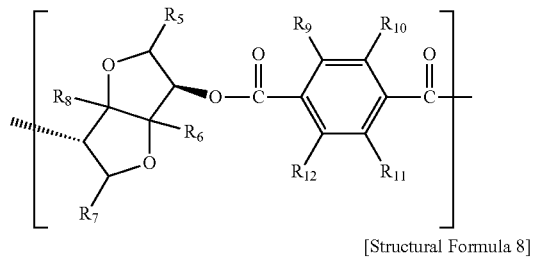

[Structural Formula 8]

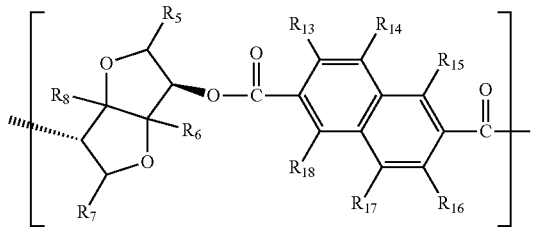

(in the above Structural Formula 5 to Structural Formula 8, $R_1$ to $R_{18}$ are identical to or different from each other and are each independently selected from the group consisting of H, substituted or unsubstituted linear or branched $C_1$-$C_{20}$ alkyl and substituted or unsubstituted $C_6$-$C_{20}$ aryl).

The copolyester may include a structure represented by the following Structural Formula 9, but may not be limited thereto:

(in the above Structural Formula 9, $R_1$ to $R_{18}$ are identical to or different from each other and are each independently selected from the group consisting of H, substituted or unsubstituted linear or branched $C_1$-$C_{20}$ alkyl and substituted or unsubstituted $C_6$-$C_{20}$ aryl, and k, l, m and n are each independently greater than 0 and less than 10, and the sum of k, l, m and n is 10, and p is from 1 to 1,000,000).

The monomer represented by the above Structural Formula 3 and the monomer represented by the above Structural Formula 4 may have a molar ratio in the range of from 1:9 to 4:6, but may not be limited thereto.

The monomers represented by the above Structural Formula 1 and Structural Formula 2 and the monomers represented by the above Structural Formula 3 and Structural Formula 4 may have a molar ratio in the range of from 1:1 to 2:1, but may not be limited thereto.

In another general aspect, the method of preparing a copolyester includes: preparing a prepolymer by esterification of monomers represented by the following Structural Formula 1 to Structural Formula 4; and preparing the copolyester by condensation of the prepolymer and a catalyst:

[Structural Formula 1]

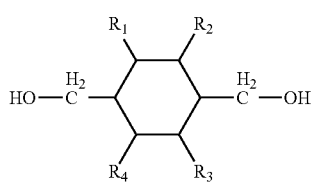

[Structural Formula 2]

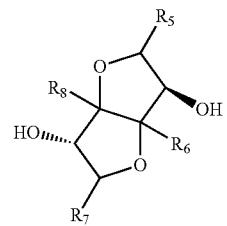

[Structural Formula 9]

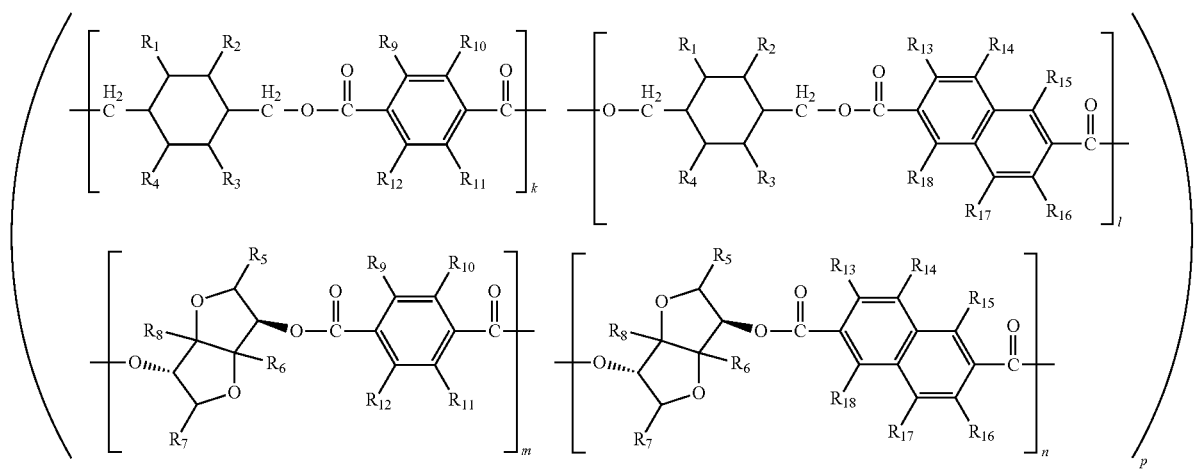

[Structural Formula 3]

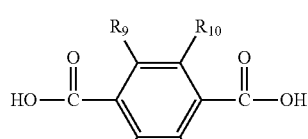

[Structural Formula 4]

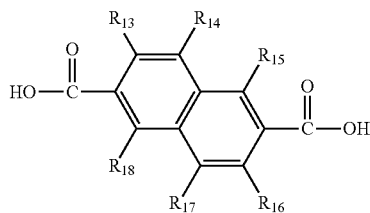

(in the above Structural Formula 1 to Structural Formula 4, $R_1$ to $R_{18}$ are identical to or different from each other and are each independently selected from the group consisting of H, substituted or unsubstituted linear or branched $C_1$-$C_{20}$ alkyl and substituted or unsubstituted $C_6$-$C_{20}$ aryl).

The esterification may be performed at a temperature of 200° C. to 300° C., but may not be limited thereto.

The catalyst may be selected from the group consisting of titanium butoxide, titanium methoxide, titanium ethoxide, titanium propoxide, titanium isopropoxide, titanium 2-ethylhexoxide, tantalum pentoxide, zirconium butoxide and combinations thereof, but may not be limited thereto.

In the condensation, a thermal stabilizer may be added, but may not be limited thereto.

The thermal stabilizer may include an inorganic phosphoric acid selected from the group consisting of phosphorous acid, phosphoric acid and combinations thereof or an organic phosphoric acid ester selected from the group consisting of dibutyl phosphoric acid, tributyl phosphoric acid, trioctyl phosphoric acid, triphenyl phosphoric acid, triphenyl phosphorous acid and combinations thereof, but may not be limited thereto.

The condensation may be performed under a pressure of 0.1 torr to 1 torr, but may not be limited thereto.

The condensation may be performed at a temperature of 200° C. to 400° C., but may not be limited thereto.

In the esterification, the monomers represented by the above Structural Formula 1 and Structural Formula 2 and the monomers represented by the above Structural Formula 3 and Structural Formula 4 may be added at a molar ratio in the range of 1:1 to 2:1, but may not be limited thereto.

After the condensation is completed, solid state polymerization may be further performed, but may not be limited thereto.

In another general aspect, an optical film includes the copolyester.

Other features and aspects will be apparent from the following detailed description, the drawings, and the claims.

BRIEF DESCRIPTION OF THE DRAWINGS

FIG. 1 shows a structural formula of a copolyester according to an embodiment of the present disclosure.

FIG. 2 shows an optical film including a copolyester according to an embodiment of the present disclosure.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Through the whole document, the term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

Through the whole document, a phrase in the form "A and/or B" means "A or B, or A and B".

The features of the examples described herein may be combined in various ways as will be apparent after an understanding of the disclosure of this application. Further, although the examples described herein have a variety of configurations, other configurations are possible as will be apparent after an understanding of the disclosure of this application.

According to the above-described embodiments of the present disclosure, a copolyester according to the present disclosure makes it possible to provide an optical film for display purposes with enhanced performance.

The copolyester according to the present disclosure has a lower water absorption than polyimide (PI) which has been conventionally used as a film for display purposes. PI has high water absorption properties due to an —N containing polar structure, whereas the polymer according to the present disclosure, which is polyester, has lower water absorption properties than PI.

Also, PET which has been conventionally used for manufacturing a polyester film has a glass transition temperature ($T_g$) of about 80° C., whereas the copolyester according to the present disclosure has a glass transition temperature ($T_g$) of about 126° C. and thus has excellent thermal resistance.

Further, PEN, which has been conventionally used for manufacturing an optical (particularly, OLED) high heat-resistance polyester film for a TFT substrate has a naphthalene structure, and thus has a higher $T_g$ and a higher birefringence than PET, whereas the copolyester according to the present disclosure has a higher birefringence and remarkably lower water transmission and water absorption than PEN, and thus is suitable for an optical film.

Furthermore, PCT, which has been conventionally used for manufacturing a high heat-resistance polyester film has a very high melting temperature ($T_m$) of 300° C. or more, and thus requires high energy for melt polymerization. Also, PCT has a fast crystallization rate, and thus can be easily fragmented in a film extrusion process and can lose film transparency at high temperature due to crystallization, whereas the copolyester according to the present disclosure improves the problems of PCT.

As described above, the copolyester according to the present disclosure improves the problems of the materials, which have been conventionally used as an optical film and has transparency and flexibility, and thus can be used as a TFT substrate for an OLED, a barrier film, a display panel back substrate, a screen protection film, a solar cell substrate or an electrical insulation film. Also, the copolyester according to the present disclosure can be used in a flexible device.

Hereinafter, a copolyester of the present disclosure will be described in detail with reference to embodiments, examples and drawings. However, the present disclosure is not limited to these embodiments, examples and drawings.

In one general aspect of the present disclosure, the copolyester includes a polymer formed by polymerization of monomers represented by the following Structural Formula 1 to Structural Formula 4:

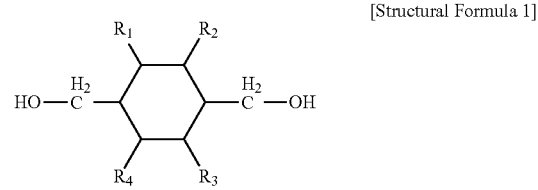

[Structural Formula 1]

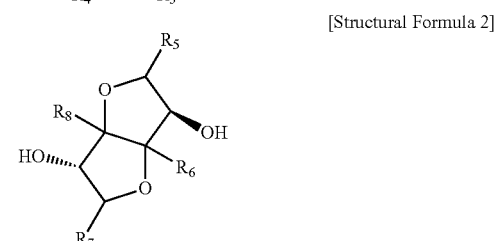

[Structural Formula 2]

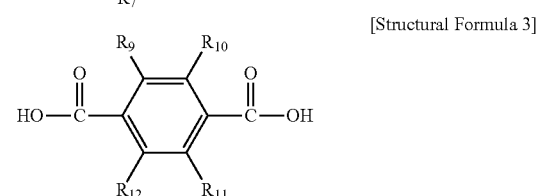

[Structural Formula 3]

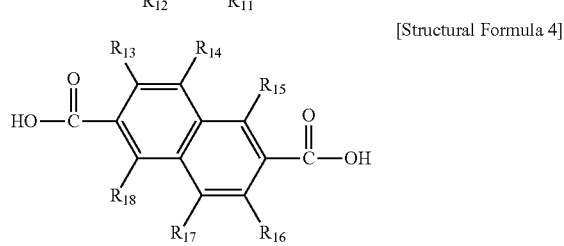

[Structural Formula 4]

(in the above Structural Formula 1 to Structural Formula 4, $R_1$ to $R_{18}$ are identical to or different from each other and are each independently selected from the group consisting of H, substituted or unsubstituted linear or branched $C_1$-$C_{20}$ alkyl and substituted or unsubstituted $C_6$-$C_{20}$ aryl).

The Structural Formula 1 represents 1,4-cyclohexanedimethanol (CHDM), the Structural Formula 2 represents isosorbide (ISB), the Structural Formula 3 represents terephthalic acid (TPA), and the Structural Formula 4 represents 2,6-naphthalenedicarboxylic acid (NDA).

The monomer represented by the above Structural Formula 1 or Structural Formula 2 and the monomer represented by the above Structural Formula 3 or Structural Formula 4 may be each independently bonded to form a polymer, but may not be limited thereto.

The copolyester may include a structure represented by the following Structural Formula 5 to Structural Formula 8, but may not be limited thereto:

[Structural Formula 5]

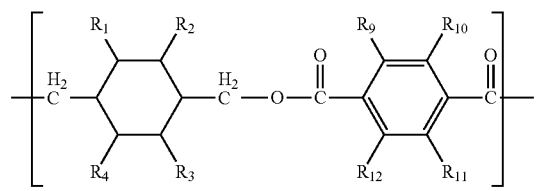

[Structural Formula 8]

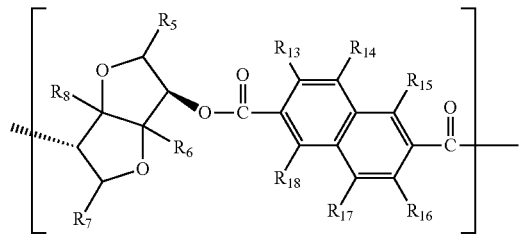

(in the above Structural Formula 5 to Structural Formula 8, $R_1$ to $R_{18}$ are identical to or different from each other and are each independently selected from the group consisting of H, substituted or unsubstituted linear or branched $C_1$-$C_{20}$ alkyl and substituted or unsubstituted $C_6$-$C_{20}$ aryl).

The copolyester may include a structure represented by the following Structural Formula 9, but may not be limited thereto.

[Structural Formula 9]

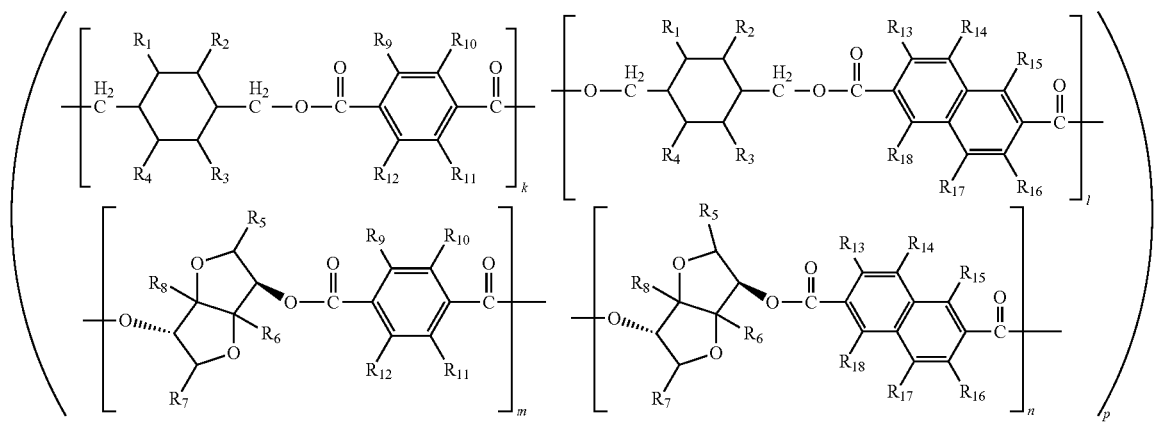

-continued

[Structural Formula 6]

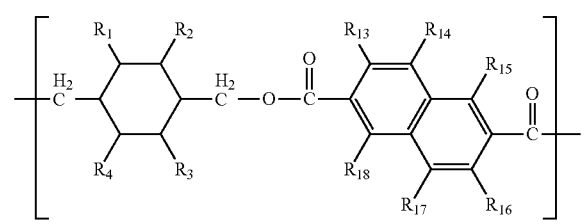

[Structural Formula 7]

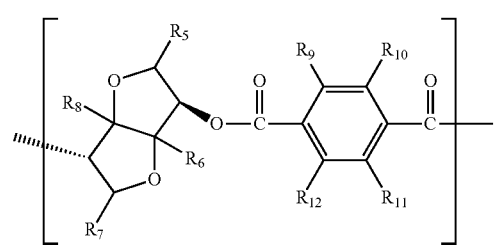

(in the above Structural Formula 9, $R_1$ to $R_{18}$ are identical to or different from each other and are each independently selected from the group consisting of H, substituted or unsubstituted linear or branched $C_1$-$C_{20}$ alkyl and substituted or unsubstituted $C_6$-$C_{20}$ aryl, and k, l, m and n are each independently greater than 0 and less than 10, and the sum of k, l, m and n is 10, and p is from 1 to 1,000,000).

The Structural Formula 5 to the Structural Formula 8 included in the Structural Formula 9 may be randomly arranged and polymerized.

In the above Structural Formula 9, the k, l, m, and n are relative molar ratios of the Structural Formula 5 to the Structural Formula 8, respectively. That is, in the Structural Formula 9 forming the copolyester, the Structural Formula 5 to the Structural Formula 8 may be present at a molar ratio of k:l:m:n, but may not be limited thereto.

FIG. 1 shows a structural formula of the copolyester according to an embodiment of the present disclosure.

According to an embodiment of the present disclosure, the monomer represented by the above Structural Formula 3 and the monomer represented by the above Structural Formula 4 may have a molar ratio in the range of from 1:9 to 4:6, but may not be limited thereto.

The copolyester may have various properties depending on the molar ratios of the monomer represented by the Structural Formula 4 and the monomer represented by the Structural Formula 3, but may not be limited thereto.

For example, if the molar ratio of the monomer represented by the Structural Formula 4 is smaller than the molar ratio of the monomer represented by the Structural Formula 3, the thermal resistance may be degraded. Further, if the molar ratio of the monomer represented by the Structural Formula 4 is equal to the molar ratio of the monomer represented by the Structural Formula 3, the melting temperature may be extremely low.

The molar ratio of the monomer represented by the Structural Formula 4 may be greater than the molar ratio of the monomer represented by the Structural Formula 3. However, if the molar ratio of the monomer represented by the Structural Formula 4 is much greater than the molar ratio of the monomer represented by the Structural Formula 3, the melting temperature may be extremely increased, which is not suitable for condensation and film extrusion to be described below.

According to an embodiment of the present disclosure, the copolyester includes the monomer represented by the Structural Formula 3 and the monomer represented by the Structural Formula 4, and thus may have an enhanced thermal resistance and an improved birefringence, but may not be limited thereto.

Also, the problem caused by crystallization may be solved by adjusting the molar ratios of the monomer represented by the Structural Formula 3 and the monomer represented by the Structural Formula 4, but the present disclosure may not be limited thereto.

According to an embodiment of the present disclosure, the monomers represented by the above Structural Formula 1 and Structural Formula 2, and the monomers represented by the above Structural Formula 3 and Structural Formula 4 may have a molar ratio in the range of from 1:1 to 2:1, but may not be limited thereto.

According to an embodiment of the present disclosure, the copolyester includes the monomer represented by the Structural Formula 1 and the monomer represented by the Structural Formula 2, which are cyclic aliphatic units and thus may have a reduced water absorption and enhanced water barrier properties, but may not be limited thereto.

The copolyester includes the monomer represented by the Structural Formula 2 and thus may have an enhanced thermal resistance. If the copolyester includes the Structural Formula 2 at an extremely high molar ratio, the crystallization rate may be extremely decreased.

In another general aspect of the present disclosure, there a method of preparing a copolyester, includes: preparing a prepolymer by esterification of monomers represented by the following Structural Formula 1 to Structural Formula 4; and producing the copolyester by condensation of the prepolymer and a catalyst:

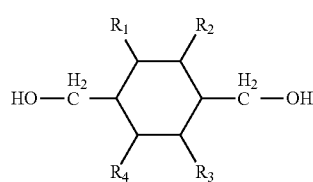

[Structural Formula 1]

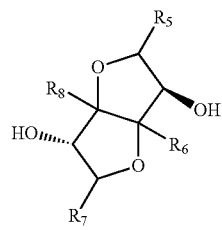

[Structural Formula 2]

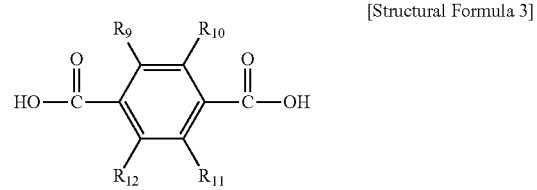

[Structural Formula 3]

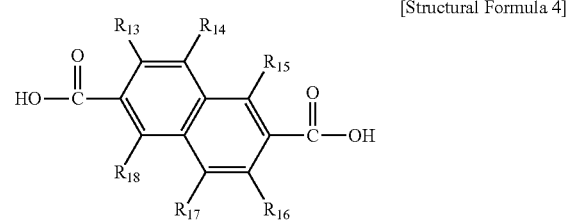

[Structural Formula 4]

(in the above Structural Formula 1 to Structural Formula 4, $R_1$ to $R_{18}$ are identical to or different from each other and are each independently selected from the group consisting of H, substituted or unsubstituted linear or branched $C_1$-$C_{20}$ alkyl and substituted or unsubstituted $C_6$-$C_{20}$ aryl).

The copolyester synthesized by the above-described method includes cyclic aliphatic units.

Detailed descriptions of parts in the method of preparing the copolyester according to the aspect of the present disclosure, which overlap with the copolyester described above, are omitted hereinafter, but the descriptions of the copolyester may be identically applied to the method of preparing the copolyester, even though they are omitted hereinafter.

The esterification may be performed at a temperature of 200° C. to 300° C., but may not be limited thereto. Preferably, the esterification may be performed at a temperature of 260° C. to 280° C.

An ester bond formed by the esterification does not include an —N containing polar structure, and thus has a lower water absorption than, for example, amide, imide, and the like.

The catalyst may be selected from the group consisting of titanium butoxide, titanium methoxide, titanium ethoxide, titanium propoxide, titanium isopropoxide, titanium 2-ethylhexoxide, tantalum pentoxide, zirconium butoxide and combinations thereof, but may not be limited thereto. Preferably, the catalyst may be titanium butoxide.

In the condensation, a thermal stabilizer may be added, but may not be limited thereto.

The thermal stabilizer may include an inorganic phosphoric acid selected from the group consisting of phosphorous acid, phosphoric acid and combinations thereof or an organic phosphoric acid ester selected from the group consisting of dibutyl phosphoric acid, tributyl phosphoric acid, trioctyl phosphoric acid, triphenyl phosphoric acid, triphenyl phosphorous acid and combinations thereof, but may not be limited thereto. Preferably, the thermal stabilizer may be phosphorous acid.

The condensation may be performed under a pressure of from 0.1 torr to 1 torr, but may not be limited thereto. Preferably, the condensation may be performed under a pressure of from 0.5 torr to 0.7 torr.

The condensation may be performed at a temperature of from 200° C. to 400° C., but may not be limited thereto. Preferably, the condensation may be performed at a temperature of from 250° C. to 310° C.

The esterification and the condensation may be performed by melt polymerization, but may not be limited thereto. Due to the melt polymerization, additional solvent is not necessary.

In the esterification, the monomers represented by the above Structural Formula 1 and Structural Formula 2 and the monomers represented by the above Structural Formula 3 and Structural Formula 4 may be added at a molar ratio in the range of 1:1 to 2:1, but may not be limited thereto.

After the condensation is completed, solid state polymerization may be further performed, but may not be limited thereto. By performing the solid state polymerization, additional polymerization progresses may proceed, and, thus, the molecular weight is further increased. Accordingly, the intrinsic viscosity is increased by the solid state polymerization.

As will be described below, a film extrusion process may be performed in addition to the solid state polymerization, and, thus, an optical film can be obtained.

During the film extrusion process, the copolyester is melted and then cooled passing through a slit of a flat die of an extruder and extruded in the form of a sheet or a film.

A crystal structure of the polymer varies depending on the speed of the cooling. For example, a film with excellent transparency can be produced by water cooling method, but may not be limited thereto.

According to another aspect of the present disclosure, an optical film including the copolyester of the present disclosure is disclosed.

Detailed descriptions of parts in the optical film according to the aspect of the present disclosure, which overlap with those of the copolyester and the method of preparing the copolyester of the present disclosure, are omitted hereinafter, but the descriptions of the copolyester and the method may be identically applied to the optical film of the present disclosure, even though they are omitted hereinafter.

For example, FIG. 2 shows an optical film including a copolyester including cyclic aliphatic units according to an embodiment of the present disclosure.

The optical film can be obtained by further performing the film extrusion process after the solid state polymerization described above, but may not be limited thereto.

The optical film has an improved birefringence and remarkably reduced water transmission and water absorption and is transparent and not easily broken. Therefore, it can be used in a display device and an optical device. For example, the optical film may be used in a TFT substrate for an OLED, a barrier film, a display panel back substrate, a screen protection film, a solar cell substrate or an electrical insulation film.

Hereinafter, the present disclosure will be described in more detail with reference to examples. The following examples are provided only for explanation, but do not intend to limit the scope of the present disclosure.

[Example 1] Production of Copolyester

To produce copolyester, 1089 g of 1,4-cyclohexanedimethanol (CHDM), 414 g of isosorbide (ISB), 249 g of terephthalic acid (TPA) and 973 g of 2,6-naphthalenedicarboxylic acid (NDA) were put into an esterification reactor (3 L) and mixed therein and then, the mixture was reacted for 2 hours while gradually increasing the temperature to 270° C.

As the esterification reaction progressed, water (by-product) was discharged to the outside. After 90 vol % of the produced water was removed, a prep-polymer produced by the esterification reaction was transferred to a condensation reactor (3 L) equipped with a stirrer, a cooling condenser, and a vacuum line.

Then, 5.40 g of titanium butoxide (TNBT) as a catalyst and 0.67 g of phosphorous acid as a thermal stabilizer were added to the prepolymer. While the temperature within the condensation reactor increased to from 280° C. to 305° C., the CHDM was removed in a low vacuum atmosphere of 0.1 torr or less. The reaction was carried out in the condensation reactor for 2 hours.

A reaction product was taken out of the condensation reactor and then cut into pellets, followed by a film extrusion process to produce an optical film.

Example 2

An optical film including a copolyester was produced by adding 1089 g of 1,4-cyclohexanedimethanol (CHDM), 414 g of isosorbide (ISB), 249 g of terephthalic acid (TPA), 973 g of 2,6-naphthalenedicarboxylic acid (NDA), 5.40 g of titanium butoxide (TNBT) and 0.67 g of phosphorous acid in the same manner as in Example 1.

Example 3

An optical film including a copolyester was produced by adding 973 g of 1,4-cyclohexanedimethanol (CHDM), 546 g of isosorbide (ISB), 249 g of terephthalic acid (TPA), 973 g of 2,6-naphthalenedicarboxylic acid (NDA), 5.40 g of titanium butoxide (TNBT) and 0.67 g of phosphorous acid in the same manner as in Example 1.

Example 4

An optical film including a copolyester was produced by adding 726 g of 1,4-cyclohexanedimethanol (CHDM), 828 g of isosorbide (ISB), 249 g of terephthalic acid (TPA), 973 g of 2,6-naphthalenedicarboxylic acid (NDA), 5.40 g of titanium butoxide (TNBT) and 0.67 g of phosphorous acid in the same manner as in Example 1.

Example 5

An optical film including a copolyester was produced by adding 973 g of 1,4-cyclohexanedimethanol (CHDM), 546 g of isosorbide (ISB), 1297 g of 2,6-naphthalenedicarboxylic acid (NDA), 5.56 g of titanium butoxide (TNBT) and 0.69 g of phosphorous acid in the same manner as in Example 1.

Comparative Example 1

An optical film including a copolyester was produced by adding 907 g of 1,4-cyclohexanedimethanol (CHDM), 696 g of terephthalic acid (TPA), 0.818 g of titanium butoxide and 0.073 g of phosphorous acid in the same manner as in Example 1. Herein, the copolyester corresponds to commercially available poly(1,4-cyclohexylenedimethylene terephthalate) (PCT).

Comparative Example 2

A commercially available Teonex® film (poly(ethylene naphthalate) (PEN)) produced by Teijin Dupont Film was used.

Comparative Example 3

An optical film including a copolyester was produced by adding 997 g of ethylene glycol (EG), 559 g of terephthalic acid (TPA), 0.635 g of antimony oxide ($Sb_2O_3$) and 1.10 g of phosphorous acid in the same manner as in Example 1. Herein, the copolyester corresponds to commercially available polyethylene terephthalate (PET).

Comparative Example 4

An optical film including a copolyester was produced by adding 1452 g of 1,4-cyclohexanedimethanol (CHDM), 249 g of terephthalic acid (TPA), 973 g of 2,6-naphthalenedicarboxylic acid (NDA), 5.39 g of titanium butoxide (TNBT) and 0.67 g of phosphorous acid as a thermal stabilizer in the same manner as in Example 1.

The thermal properties of the optical films produced according to Examples 1 to 5 and Comparative Examples 1 to 4, respectively, can be seen from Table 1. The glass transition temperature ($T_g$) was measured by differential scanning calorimetry (DSC) using a thermogravimetric analyzer TA Q20 with respect to about 10 mg samples in a nitrogen atmosphere at a heating rate of 10° C./min.

The water absorption and Young's modulus of the optical films produced according to Example 1 and Comparative Examples 2 to 4, respectively, can be seen from Table 2.

The transmission and birefringence of the optical films produced according to Example 1 and Comparative Examples 2 to 4, respectively, can be seen from Table 3.

As shown in FIG. 2, an optical film which is transparent and has excellent thermal resistance and remarkably low birefringence, water transmission and water absorption was obtained.

TABLE 2

|  | Example 1 | Comparative Example 2 | Comparative Example 3 | Comparative Example 4 |
|---|---|---|---|---|
| Water absorption [40° C., 100% RH] (wt %) | 0.20 | 0.46 | 0.49 | 0.32 |
| Young's modulus (GPa) | 3.80 | 3.50 | 3.00 | 1.95 |

TABLE 3

|  | Example 1 | Comparative Example 2 | Comparative Example 3 | Comparative Example 4 |
|---|---|---|---|---|
| Transmission (@550 nm) | 86.5 | 87.4 | 89.1 | 83.7 |
| Intrinsic birefringence ($\Delta n$) | 0.07 | 0.49 | 0.23 | 0.14 |

Test Example

The melting temperatures ($T_m$) shown in Table 1 to Table 3 were measured by differential scanning calorimetry (DSC) using a thermogravimetric analyzer TA Q20 with respect to about 10 mg samples in a nitrogen atmosphere at a heating rate of 10° C./min. The initial dentification temperature ($T_{id}$) and dentification temperature ($T_d$) were measured by thermogravimetric analysis (TGA) using a thermogravimetric analyzer TA Q50 with respect to from 7 mg to 10 mg samples in a nitrogen atmosphere at a heating rate of 10° C./min. The coefficient of thermal expansion (CTE) was measured using a thermomechanical analyzer (TMA6100, Seiko Exstar 6000) under a load of 50 μN at a heating rate of 5° C./min in a temperature range of from 30° C. to 100° C. The Young's modulus was measured using an INSTRON E3000, which is a UTM (Universal Testing machine), at a tension speed of 1 mm/min.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Glass transition temperature ($T_g$, ° C.) | 120 | 126 | 135 | 210 | 91 | 122 | 89 | 114 |
| Melting temperature ($T_m$, ° C.) | 279 | 274 |  | 300 | 286 | 263 | 287 | 282 |
| Heat of fusion ($\Delta H_m$, J/g) | 22 | 1 |  | 29 | 51 | 21 | 43 | 34 |
| Initial dentification temperature ($T_{id}$, ° C.) | 395 | 395 | 396 | 396 | 389 | 425 | 389 | 392 |
| Dentification temperature ($T_d$, ° C.) | 426 | 427 | 428 | 428 | 416 | 440 | 394 | 425 |
| Coefficient of thermal expansion (CTE, 30 to 100° C.) (ppm ° $C.^{-1}$) | 10 |  |  |  |  | 12 |  | 11 |

It can be seen particularly from the glass transition temperature in Table 1 that the copolyesters according to the present disclosure have excellent thermal resistance.

It can be seen from the water absorption in Table 2 that the copolyesters according to the present disclosure have low water absorption. Also, it can be seen from Young's modulus that the copolyesters according to the present disclosure are excellent in elasticity and flexibility (Young's modulus=uniaxial force per unit surface area/strain: lower Young's modulus causes greater elastic deformation).

It can be seen from the transmission in Table 3 that the copolyesters according to the present disclosure are transparent similar to the conventional transparent optical films. Further, it can be seen from the intrinsic birefringence that the copolyesters according to the present disclosure have an improved (lower) birefringence.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

We claim:

1. A copolyester represented by one of the following Structural Formula 10 to 21:

[Structural Formula 10]

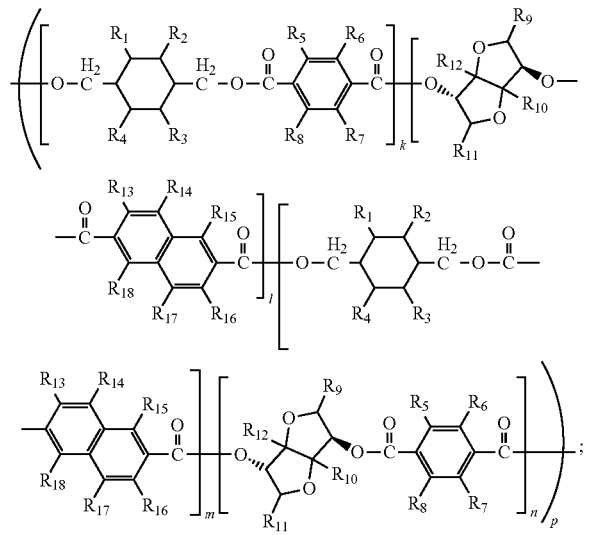

-continued

[Structural Formula 11]

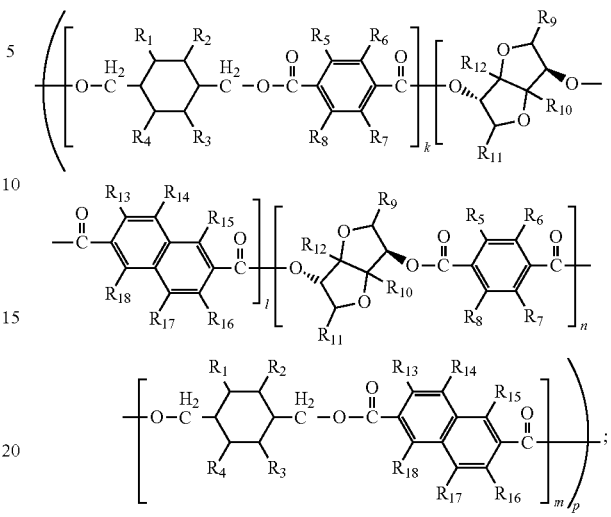

[Structural Formula 12]

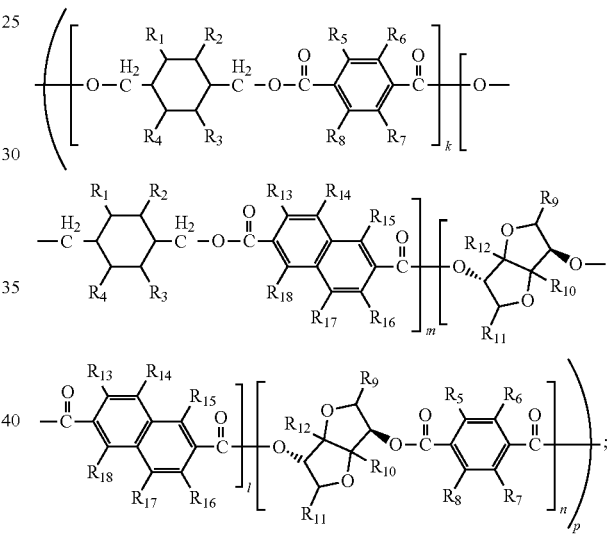

[Structural Formula 13]

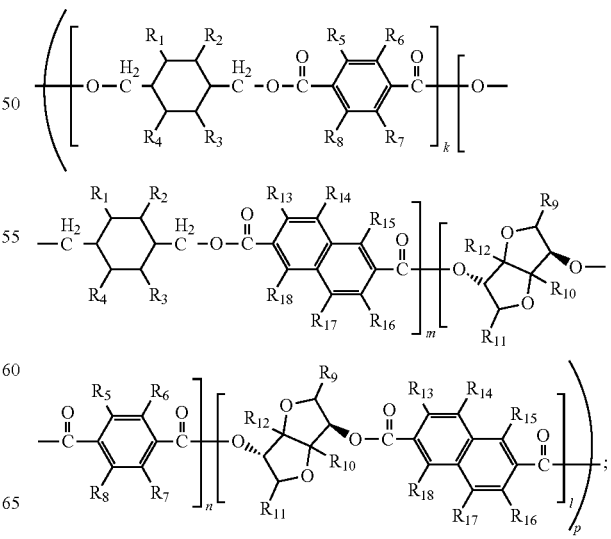

[Structural Formula 14]
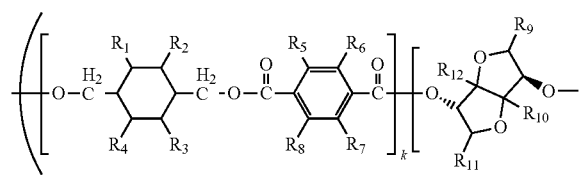
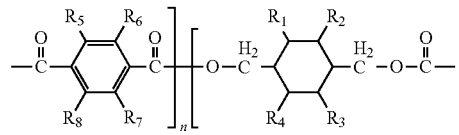
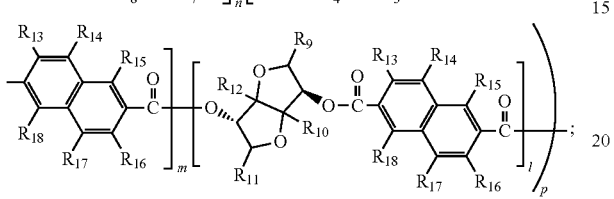
[Structural Formula 15]
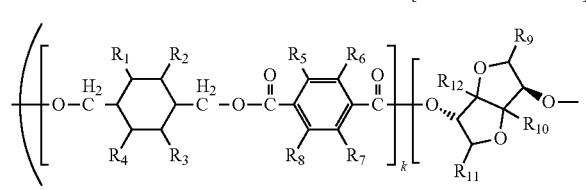
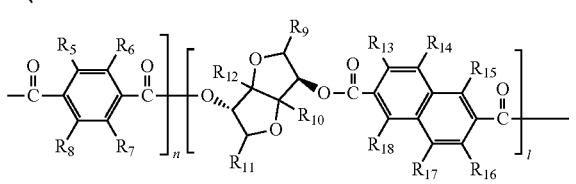
[Structural Formula 16]
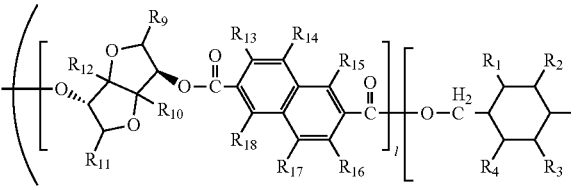
[Structural Formula 17]
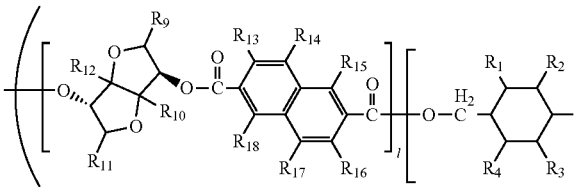
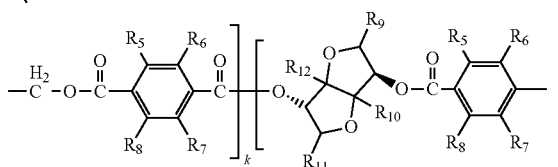
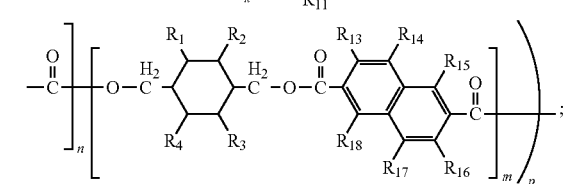
[Structural Formula 18]
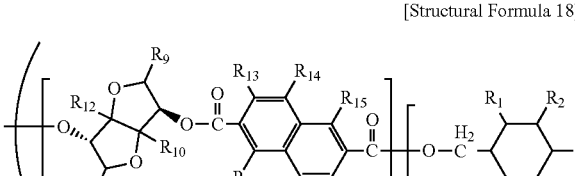
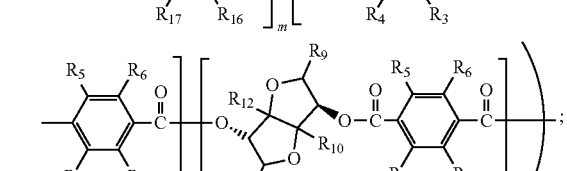
[Structural Formula 19]

-continued

[Structural Formula 20]
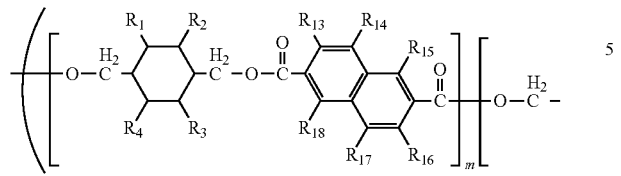

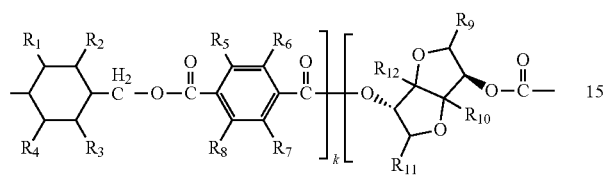

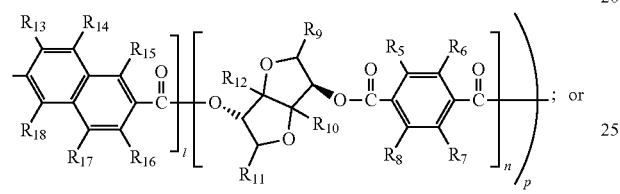

[Structural Formula 21]
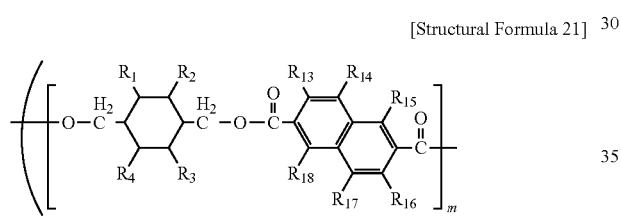

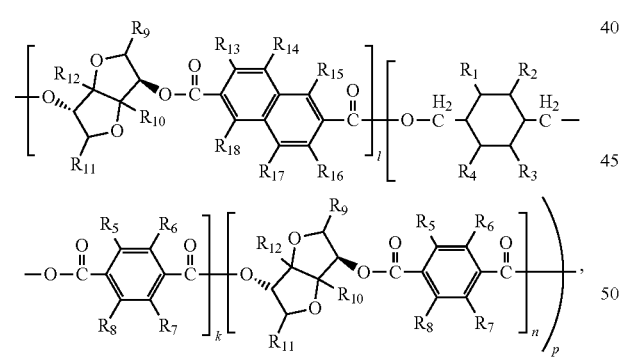

wherein, $R_1$ to $R_{18}$ are identical to or different from each other and are each independently selected from the group consisting of H, substituted or unsubstituted linear or branched $C_1$-$C_{20}$ alkyl and substituted or unsubstituted $C_6$-$C_{20}$ aryl; k, l, m and n are each independently greater than 0 and less than 10; a sum of k, l, m and n is 10; and p is from 1 to 1,000,000.

2. A method of preparing the copolyester of claim 1, comprising:

preparing a prepolymer by esterification of monomers represented by the following Structural Formula 1 to Structural Formula 4; and preparing the copolyester by condensation of the prepolymer and a catalyst:

[Structural Formula 1]
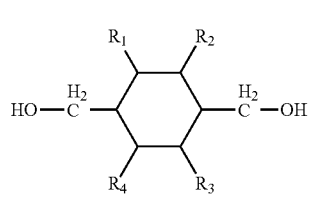

[Structural Formula 2]
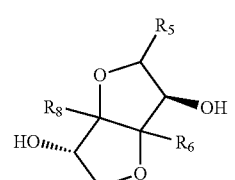

[Structural Formula 3]
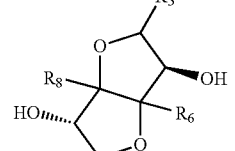

[Structural Formula 4]
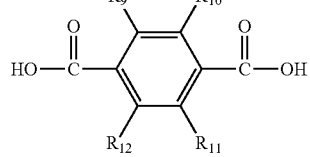

3. The method of claim 2,
wherein the esterification is performed at 200° C. to 300° C.

4. The method of claim 2,
wherein the catalyst comprises a member selected from the group consisting of titanium butoxide, titanium methoxide, titanium ethoxide, titanium propoxide, titanium isopropoxide, titanium 2-ethylhexoxide, tantalum pentoxide, zirconium butoxide and combinations thereof.

5. The method of claim 2,
wherein in the condensation, a thermal stabilizer is added.

6. The method of claim 5,
wherein the thermal stabilizer comprises an inorganic phosphoric acid selected from the group consisting of phosphorous acid, phosphoric acid and combinations thereof or an organic phosphoric acid ester selected from the group consisting of dibutyl phosphoric acid, tributyl phosphoric acid, trioctyl phosphoric acid, triphenyl phosphoric acid, triphenyl phosphorous acid and combinations thereof.

7. The method of claim 2,
wherein the condensation is performed under a pressure of 0.1 torr to 1 torr.

8. The method of claim 2,
wherein the condensation is performed at a temperature of 200° C. to 400° C.

9. The method of claim 2,
wherein in the esterification, the monomers represented by the Structural Formula 1 and Structural Formula 2 and the monomers represented by the Structural Formula 3 and Structural Formula 4 are added at a molar ratio in the range of 1:1 to 2:1.

10. The method of claim 2,
wherein, after the condensation is completed, solid state polymerization is further performed.

11. An optical film comprising the copolyester of claim 1.

* * * * *